(12) United States Patent
Chang et al.

(10) Patent No.: US 10,587,564 B2
(45) Date of Patent: Mar. 10, 2020

(54) TRACKING ELECTRONIC MAIL MESSAGES IN A SEPARATE COMPUTING SYSTEM

(71) Applicant: Microsoft Technology Licensing, LLC, Redmond, WA (US)

(72) Inventors: Jih-Shiang Chang, Bellevue, WA (US); Louis Michael Maresca, Snoqualmie, WA (US); Madan Gopal Natu, Redmond, WA (US); Jujhar Singh, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 14/945,040

(22) Filed: Nov. 18, 2015

(65) Prior Publication Data

US 2016/0261550 A1 Sep. 8, 2016

Related U.S. Application Data

(60) Provisional application No. 62/128,656, filed on Mar. 5, 2015.

(51) Int. Cl.
*G06F 15/16* (2006.01)
*H04L 12/58* (2006.01)
*G06Q 10/10* (2012.01)

(52) U.S. Cl.
CPC .......... *H04L 51/34* (2013.01); *G06Q 10/107* (2013.01); *H04L 51/22* (2013.01)

(58) Field of Classification Search
CPC ...... G06Q 10/00; G06Q 10/107; G06Q 10/06; G06Q 10/10; G06F 17/30268; G06F 17/30528; G06F 3/0484; G06F 16/164; G06F 16/27; H04L 51/16; H04L 51/24; H04L 67/00; H04L 51/066; H04L 67/1095

See application file for complete search history.

(56) References Cited

U.S. PATENT DOCUMENTS

| | | | |
|---|---|---|---|
| 6,725,228 B1 * | 4/2004 | Clark | G06Q 10/107 |
| 6,792,085 B1 * | 9/2004 | Rigaldies | H04L 51/066 |
| | | | 379/100.08 |
| 7,673,000 B2 * | 3/2010 | Smoot | G06Q 10/107 |
| | | | 709/201 |
| 8,161,125 B2 | 4/2012 | Pearson et al. | |
| 8,332,440 B2 | 12/2012 | Parker et al. | |
| 8,533,258 B2 | 9/2013 | Parker et al. | |
| 8,918,421 B2 | 12/2014 | McCormack et al. | |

(Continued)

OTHER PUBLICATIONS

"Riva CRM Integration / Screenshots / Outlook 2010 for Windows", Published on: Oct. 24, 2013, Available at: http://www.rivacrmintegration.com/screenshots/windows-outlook/#4.

(Continued)

*Primary Examiner* — Dustin Nguyen
(74) *Attorney, Agent, or Firm* — Christopher J. Volkmann; Kelly, Holt & Christenson, PLLC

(57) ABSTRACT

Content items found in a designated folder within an e-mail system are obtained by a separate computing system. The content items are converted into entities within the separate computing system, and associated with one or more other entities within the separate computing system, based on a set of mapping rules. The content items can then be surfaced, in context, in the separate computing system.

19 Claims, 16 Drawing Sheets

(56) References Cited

U.S. PATENT DOCUMENTS

| | | | | |
|---|---|---|---|---|
| 9,171,290 | B1* | 10/2015 | Croke | G06Q 10/107 |
| 2002/0099719 | A1* | 7/2002 | Schwitters | G06Q 10/107 |
| 2003/0233419 | A1* | 12/2003 | Beringer | G06Q 10/107 |
| | | | | 709/206 |
| 2005/0050147 | A1* | 3/2005 | Jani | G06Q 10/10 |
| | | | | 709/206 |
| 2005/0076087 | A1* | 4/2005 | Budd | G06Q 10/107 |
| | | | | 709/206 |
| 2006/0064434 | A1* | 3/2006 | Gilbert | G06F 16/164 |
| 2007/0061308 | A1* | 3/2007 | Hartwell | G06F 3/0484 |
| 2007/0244901 | A1* | 10/2007 | Mohler | G06Q 10/107 |
| 2008/0046518 | A1* | 2/2008 | Tonnison | G06Q 10/107 |
| | | | | 709/206 |
| 2008/0126353 | A1* | 5/2008 | Baude | G06Q 10/107 |
| 2008/0270547 | A1* | 10/2008 | Glickstien | H04L 67/1095 |
| | | | | 709/206 |
| 2009/0006413 | A1 | 1/2009 | Andersen | |
| 2009/0083566 | A1* | 3/2009 | Momenee | G06F 16/27 |
| | | | | 713/400 |
| 2009/0132490 | A1* | 5/2009 | Okraglik | G06Q 10/107 |
| 2009/0327972 | A1* | 12/2009 | McCann | G06F 17/30528 |
| | | | | 715/853 |
| 2010/0198927 | A1 | 8/2010 | Tonnison et al. | |
| 2010/0228812 | A1* | 9/2010 | Uomini | G06Q 10/00 |
| | | | | 709/203 |
| 2011/0040730 | A1* | 2/2011 | Belea | G06Q 10/107 |
| | | | | 707/654 |
| 2011/0060801 | A1* | 3/2011 | Virk | H04L 51/24 |
| | | | | 709/206 |
| 2013/0097279 | A1* | 4/2013 | Polis | H04L 67/00 |
| | | | | 709/217 |
| 2015/0186538 | A1* | 7/2015 | Yan | G06F 17/30268 |
| | | | | 707/722 |
| 2015/0269242 | A1* | 9/2015 | Dey | H04L 51/16 |
| | | | | 707/737 |

OTHER PUBLICATIONS

"Zoho Mail User Guide—Zoho Mail Add on", Published on: Sep. 8, 2013, Available at: https://www.zoho.com/mail/help/zoho-mail-add-on-settings.html.

"Get your Email inside CRM", Published on: Oct. 18, 2012 Available at: https://www.zoho.com/crm/crm-email.html.

"Mail Manager", Retrieved on: Mar. 9, 2015, Available at: https://wiki.vtiger.com/vtiger6/index.php/Mail_Manager.

"Riva CRM Synchronisation—TheIntegration Cloud for CRM and Email Systems", Retrieved on: Mar. 9, 2015, Available at: http://www.monread.ie/productivity/riva-crm-synchronisation/.

"Track an Email Using Rules Like Outlook Can . . . Crm4 on Premise—Excahnge", Retrieved on: Mar. 9, 2015, Available at: http://www.postseek.com/meta/6ce1abdf08fafef4273800871c0e643b.

"Track Emails As Activities", Retrieved on: Mar. 9, 2015, Available at: https://forums.zoho.com/topic/track-emails-as-activities.

* cited by examiner

TRACKING ELECTRONIC MAIL MESSAGES IN A SEPARATE COMPUTING SYSTEM

CROSS-REFERENCE TO RELATED APPLICATION

The present application is based on and claims the benefit of U.S. provisional patent application Ser. No. 62/128,656, filed Mar. 5, 2015, the content of which is hereby incorporated by reference in its entirety.

BACKGROUND

Computing systems are currently in wide use. Some such computing systems are communication systems, such as electronic mail systems. These types of systems can be run on local computers or on cloud-based systems where the system is offered as a service.

Other types of computing systems are deployed at organizations. They can implement a wide variety of different types of applications that enable users to perform tasks and processes in order to conduct the operations of the organization. End users at such an organization interact with the computing systems (or applications) in a wide variety of different ways. It is not uncommon for such users to use a communication system (such as an electronic mail system) to engage in communications about the organization, about the tasks or processes they perform within the organization, or about other things.

However, it can be difficult to track electronic mail messages, that are related to certain aspects or components of the computing system deployed by the organization. It can also be difficult to correlate email messages received to items within the computing system deployed by the organization.

The discussion above is merely provided for general background information and is not intended to be used as an aid in determining the scope of the claimed subject matter.

SUMMARY

Content items found in a designated folder within an e-mail system are obtained by a separate computing system. The content items are converted into entities within the separate computing system, and associated with one or more other entities within the separate computing system, based on a set of mapping rules. The content items can then be surfaced, in context, in the separate computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
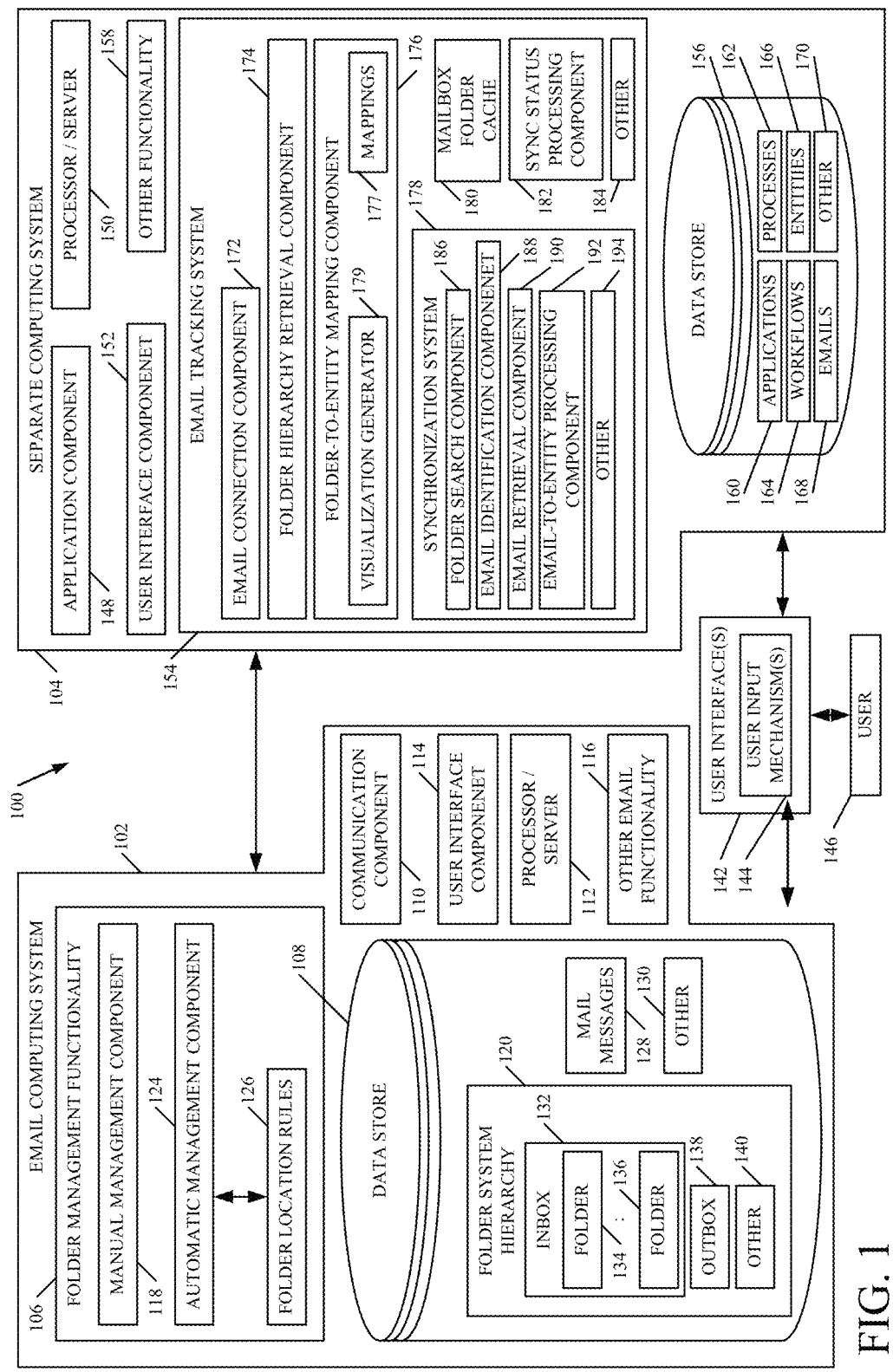
FIG. 1 is a block diagram of one example of a computing system architecture.

FIG. 1 is a block diagram of one example of a computing system architecture 100. Architecture 100 illustratively includes electronic mail (e-mail) computing system 102 and a separate computing system 104. Separate computing system 104 can be any of a wide variety of different types of computing systems. For instance, it can be a control system for controlling a wide variety of different types of machines or other components. It can be another communication system. It can be any of a variety of different types of computing systems that are deployed by organizations in order to perform operations, such as a customer relations management (CRM) system, an enterprise resource planning (ERP) system, a line-of-business system, or a wide variety of other systems. It will be described, in some examples herein as a CRM system. However, it will be appreciated that this is only one example, and it can be any of a variety of other systems as well.

It may be that users of the systems in architecture 100 wish to track electronic mail messages received by e-mail computing system 102, as entities or activities or other records within separate computing system 104. In some current systems, this has meant that separate components or software must be installed within e-mail computing system 102 in order to identify and track incoming messages. In such a scenario, the components installed in each individual e-mail computing system 102 will be different, depending on the particular type of e-mail system that is deployed. In other current systems, the user of e-mail computing system 102 needs to tag incoming emails with a special property to indicate how the e-mail message should be processed. Again, this has meant that the user's e-mail system must be modified, or that some components must be installed on the system, in order to perform the tracking and handling of these types of e-mail messages. With architecture 100, however, separate computing system 104 automatically discovers the folder hierarchy of folders in e-mail computing system 102. It can then either automatically track emails in a selected folder, within separate computing system 104, or it can surface a user experience that allows a user to map folders within e-mail computing system 102 to entities or other records within separate computing system 104. This can be done without installing add-ins or other additional components on e-mail computing system 102, and it can take advantage of native functionality within e-mail computing system 102 as well.

Before describing the operation of architecture 100 in more detail, a brief overview of some of the items within architecture 100, and their operation, will first be provided.

In the example shown in FIG. 1, e-mail computing system 102 illustratively includes folder management functionality 106, data store 108, communication component 110, one or more processors or servers 112, user interface component 114, and it can include a variety of other e-mail functionality 116. Folder management functionality 106 illustratively includes manual management component 118, automatic management component 124 and folder location rules 126. Component 118, allows a user to manually manage (e.g., create, delete, modify, etc.) folders within a folder system 120 in e-mail computing system 102. Automatic management component 124 illustratively accesses a set of user configurable folder location rules 126 and performs folder management operations based on those rules, automatically. By way of example, folder location rules 126 can specify characteristics of incoming e-mail messages that are used to direct the incoming e-mail messages to a given folder in the inbox of a user. Other folder management operations can be performed as well.

Data store 108 illustratively includes not only the folder system hierarchy 120 that specifies a folder hierarchy within e-mail computing system 102, but it can also illustratively stores the actual e-mail messages 128, and a variety of other information 130. Folder system hierarchy 120 is shown with an inbox 132 that has a plurality of hierarchically arranged folders 134-136. It is also shown with outbox 138, and it can include other folders 140. In one example, the folders 134-136 are arranged according to a hierarchy which is defined by a hierarchical arrangement of connected nodes. Each node represents a folder or a set of folders. Nodes higher up in the hierarchy are ancestor nodes relative to nodes lower down in the hierarchy. Thus, for example, the inbox 132 in folder system hierarchy 120 may have a first folder 134 that represents mail messages received from a first sender (or regarding a first subject matter), and a second folder 136 that stores mail messages received from a second sender (or regarding a second subject matter). Each of the folders 134-136 may have subfolders that store folders that are not only received from the first or second sender, respectively, but may be further divided into categories, such as categories based on content, or other categories.

Communication component 110 illustratively performs operations that are used by e-mail computing system 102 in communicating with other systems (such as in sending and receiving electronic mail messages). User interface component 114 illustratively generates one or more user interfaces 142 with user input mechanisms 144 for interaction by user 146. User 146 illustratively interacts with user input mechanisms 144 in order to control and manipulate e-mail computing system 102.

Separate computing system 104 illustratively includes application component 148, one or more processors or servers 150, user interface component 152, email tracking system 154, data store 156, and it can include other items 158. Data store 156 illustratively stores one or more applications 160, processes 162, workflows 164, entities 166, electronic mail messages 168 that have been input into system 104, and it can include a wide variety of other items 170. Application component 148 illustratively runs one or more applications 160 to perform processes 162 and workflows 164. In doing so, it can operate on one or more entities 166, e-mail messages 168, or other data records.

Entities 166 illustratively represent items within separate computing system 104. They can be objects or they can have even more rich functionality. For instance, a customer entity may describe and represent a customer. A vendor entity may describe and represent a vendor. A product entity may describe and represent a product. A quote entity may describe and represent a quote. An opportunity entity may describe and represent a business opportunity, while a lead entity may describe and represent a lead. There are a great many other or different entities that can be used to represent items within separate computing system 104, and those described herein are described for the sake of example only.

E-mail tracking system 154 illustratively interacts with e-mail computing system 102 to track e-mails in relation to various entities 166, workflows 164, processes 162, etc. in computing system 104. Thus, in the example shown in FIG. 1, e-mail tracking system 154 illustratively includes e-mail connection component 172 that connects with communication component 110 (or another component) in e-mail computing system 102. E-mail tracking system 154 also illustratively includes folder hierarchy retrieval component 174, folder-to-entity mapping component 176, synchronization system 178, mailbox folder cache 180, sync status processing component 182, and it can include other items 184.

Folder hierarchy retrieval component 174 illustratively retrieves the e-mail folder system hierarchy 120 from e-mail computing system 102. Folder-to-entity mapping component 176 includes a visualization generator component 179 that can be used to conduct a user experience that allows user 146 to create mappings 177 that map folders in the folder system hierarchy 120 to various entities or other components within computing system 104.

Synchronization system 178 illustratively synchronizes e-mail items from the identified folders to computing system 104. Thus, synchronization system 178 can illustratively include folder search component 186, e-mail identification component 188, e-mail retrieval component 190, e-mail-to-entity processing component 192, and it can include other items 194. Folder search component 186 and e-mail identification component 188 identify and retrieve the contents of the selected folders from e-mail computing system 102 and identify electronic mail items within those folders that have yet to be processed. E-mail retrieval component 190 retrieves the electronic mail items and email-to-entity processing component 192 processes those electronic mail messages by generating any desired records (e.g., entities 166) within computing system 104, and associates the electronic mail items with any other entities, processes, workflows, etc., within computing system 104.

Sync status processing component 182 can then mark the e-mail items as having already been synchronized to system 104. It can also communicate with e-mail computing system 102 to update the status of those e-mail items to indicate this, in system 102.

Figure 2:
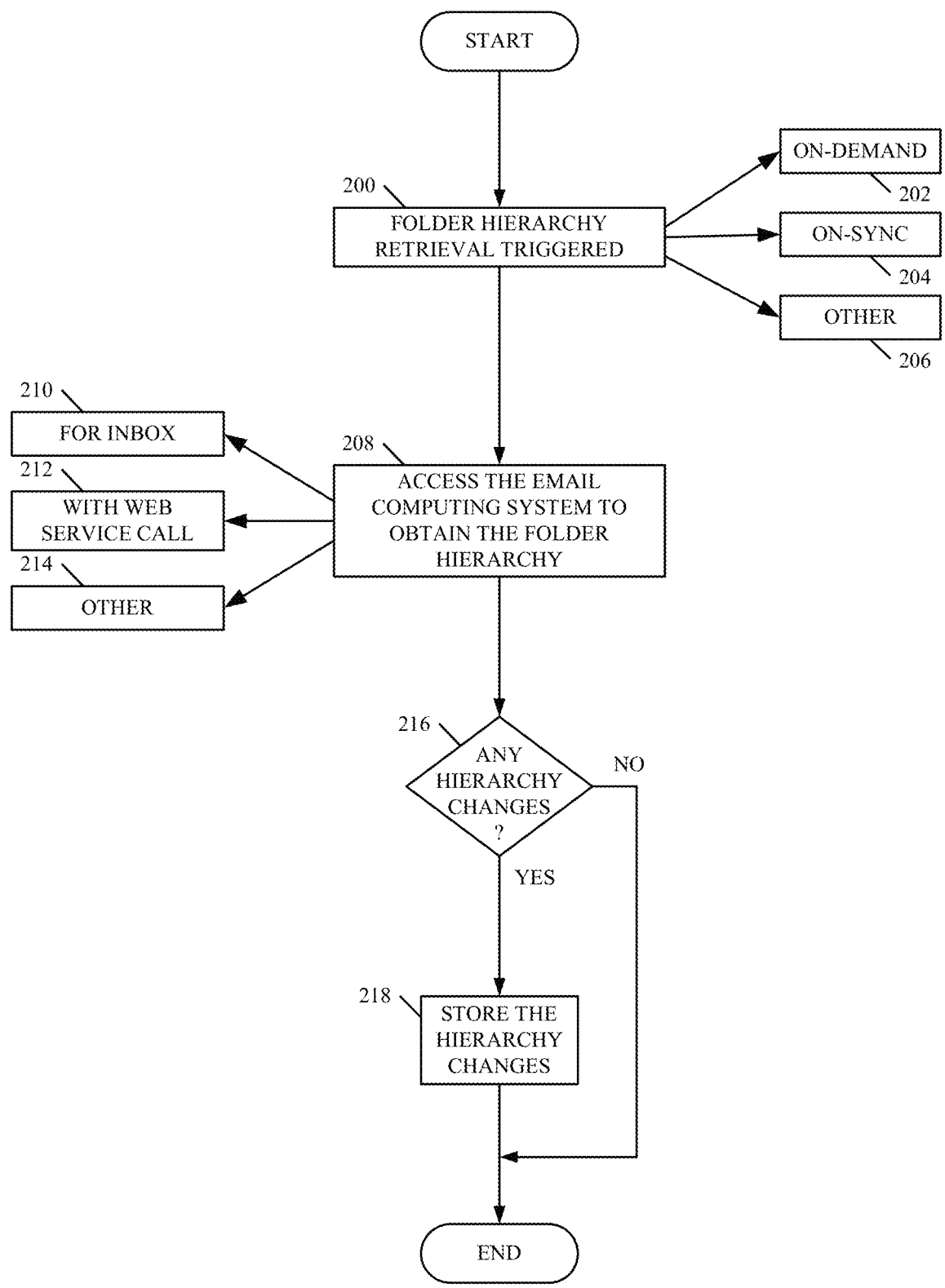
FIG. 2 is a flow diagram illustrating one example of the operation of the architecture shown in FIG. 1, in passing a folder hierarchy from one system to the other.

FIG. 2 is a flow diagram illustrating one example of the operation of folder hierarchy retrieval component 174. In one example, folder hierarchy retrieval is first triggered. This is indicated by block 200 in FIG. 2. It can be triggered in a wide variety of different ways. For instance, in one example, it can be triggered "on-demand". In such a scenario, user 146 may provide an input that is detected by separate computing system 104 indicating that user 146 wishes to access the user experience conducted by folder-to-entity mapping component 176 in order to map various folders within e-mail computing system 102 to entities or other components of separate computing system 104. Triggering the folder hierarchy retrieval on-demand is indicated by block 202. In another example, synchronization system 178 may intermittently, periodically, or based on other trigger criteria, synchronize e-mail items from the selected folders in e-mail computing system 102 to separate computing system 104. Folder hierarchy retrieval component 174 may be triggered upon the occurrence of those synchronization criteria. This is indicated by block 204. The folder hierarchy retrieval can be triggered in other ways as well, and this is indicated by block 206.

Folder hierarchy retrieval component 174 then accesses the e-mail computing system 102 to obtain the folder hierarchy 120. This is indicated by block 208 in FIG. 2. It can do this in a variety of different ways. In one example, it only obtains a portion of the folder hierarchy for which the user's inbox is a root node in the hierarchy. This is indicated by block 210. This way, other folder hierarchy elements (such as the outbox, deleted items, etc.) need not be obtained.

Also, in one example, the folder hierarchy can be obtained by issuing a web service call to e-mail computing system 102. This is indicated by block 212. The response to the web service call may be an indication of the folder hierarchy in serialized form, or in other forms.

Folder hierarchy retrieval component 174 can interact with e-mail computing system 102 in other ways as well, in order to obtain the e-mail folder hierarchy (or at least a relevant portion of the folder hierarchy, such as that corresponding to the user's inbox). This is indicated by block 214 in FIG. 2.

Component 174 then compares the obtained folder hierarchy to any hierarchy that it has previously retrieved for this user (if one was previously retrieved) to determine whether there are any changes in the hierarchy. If there was no previous retrieval of a folder hierarchy for this user, then the entire relevant part of the retrieved folder hierarchy is stored. If the hierarchy for this user was previously retrieved, then the stored hierarchy is updated with any changes made to that hierarchy since it was last retrieved. Determining whether there are any hierarchy changes is indicated by block 216, and storing the hierarchy changes is indicated by block 218. In one example, the folder hierarchy is stored in a mailbox folder cache 180 (shown in FIG. 1). In this way, it can be retrieved for surfacing to the user, in a relatively efficient manner.

Figure 3:
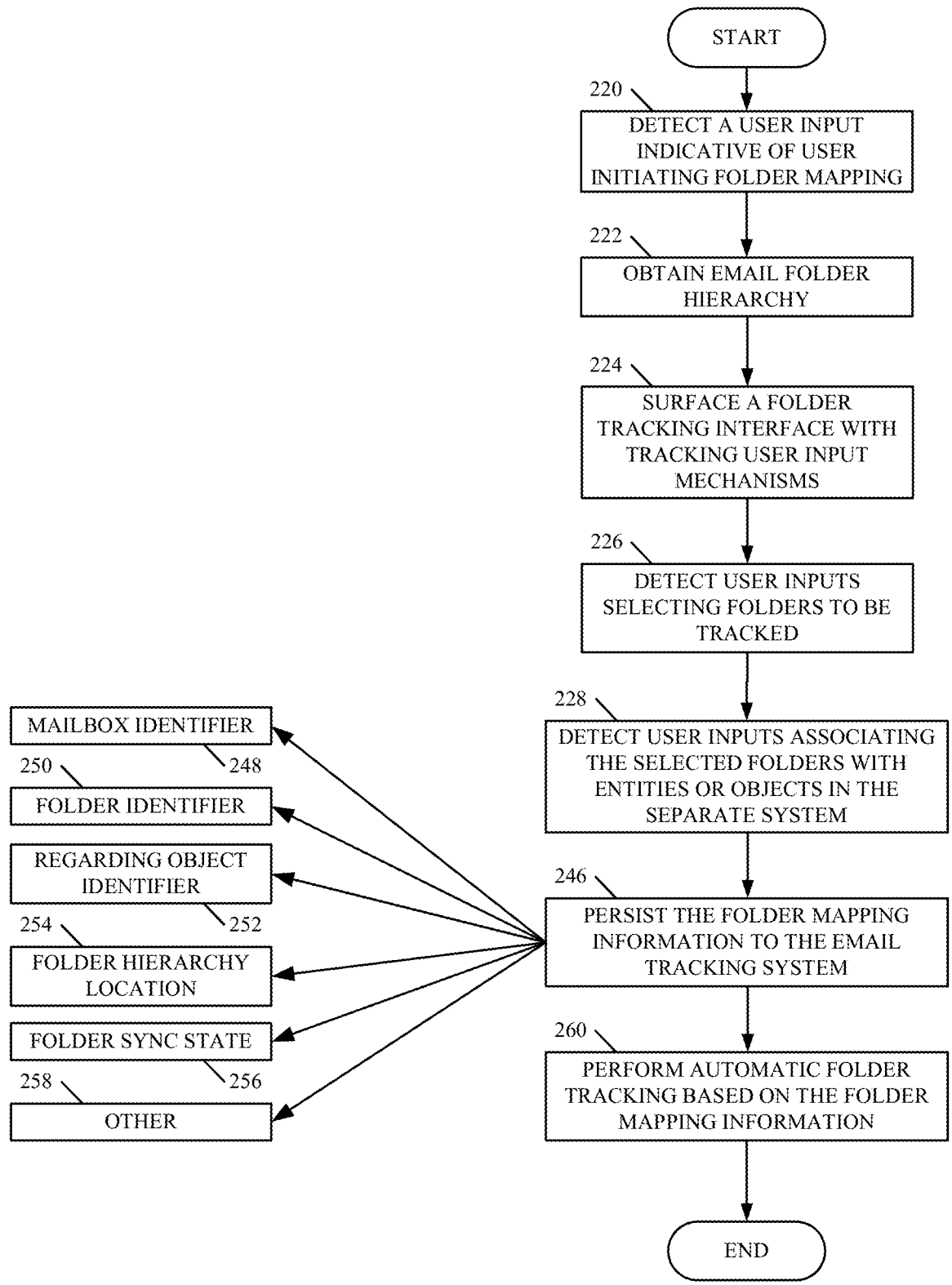
FIG. 3 is a flow diagram illustrating the operation of a portion of the architecture shown in FIG. 1 in mapping folders from an electronic mail system to entities in a separate computing system.

FIG. 3 is a flow diagram illustrating one example of the operation of folder-to-entity mapping component 176 in conducting a user experience that allows user 146 to map selected folders from e-mail computing system 102 to entities or other components within separate computing system 104, so that they can be tracked within computing system 104. Folder-to-entity mapping component 176 first detects a user input indicating that the user wishes to initiate the folder mapping experience. This is indicated by block 220 in FIG. 3. This can take a wide variety of different forms. For instance, it may be that the user actuates a given user input mechanism to indicate this, or it can be indicated in other ways.

Component 174 then obtains the e-mail folder hierarchy for the present user. This is indicated by block 222. Again, the hierarchy can be accessed "on-demand" from e-mail computing system 102. In another example, it is retrieved from mailbox folder cache 180. It can be obtained in other ways as well. Visualization generator 179 then surfaces a folder tracking interface with tracking user input mechanisms that allow the user to identify folders within the folder hierarchy and indicate how they should be tracked within system 104. Surfacing the folder tracking interface with the user input mechanisms is indicated by block 224 in FIG. 3.

Figure 4A:
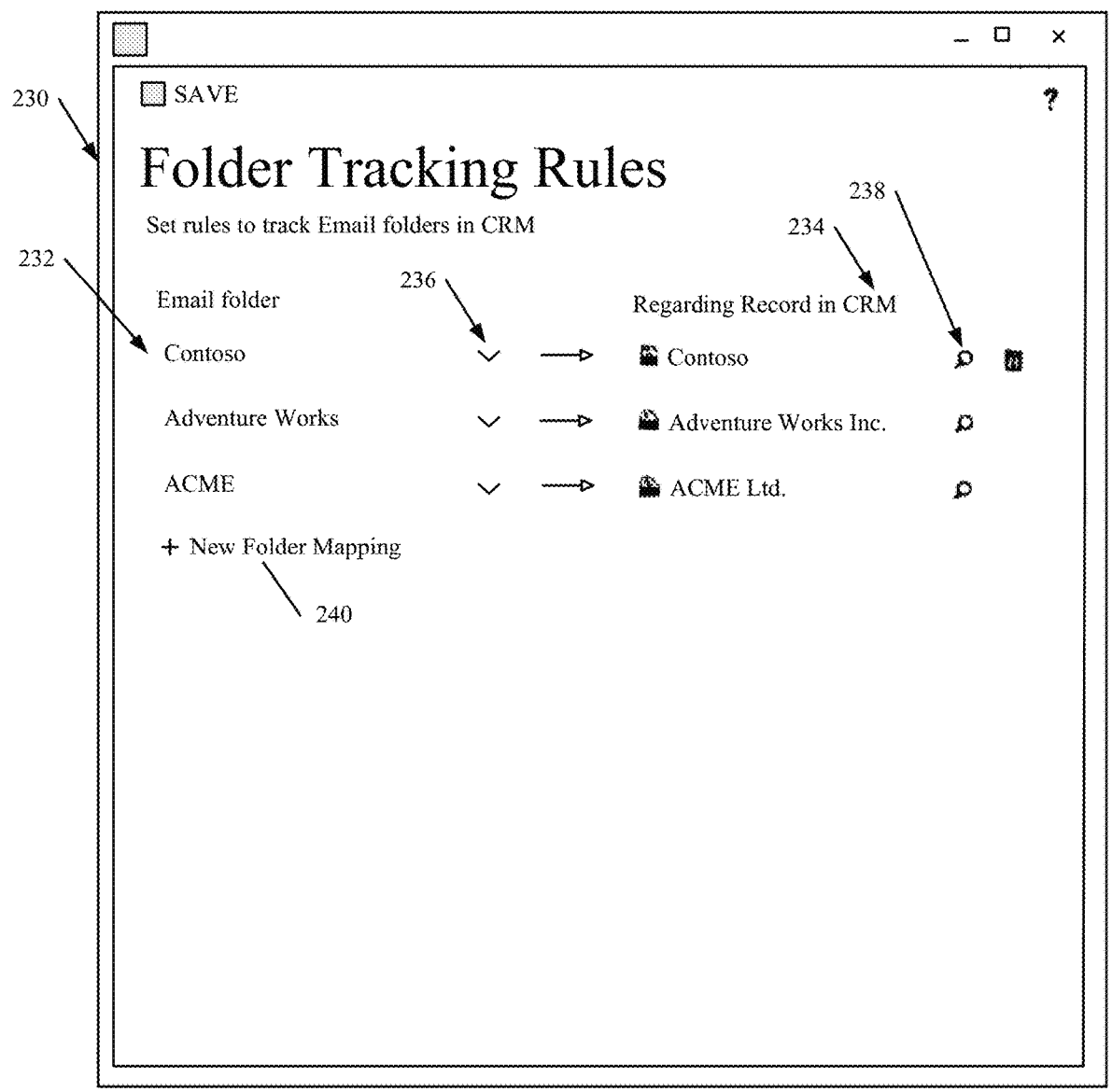
FIGS. 4A and 4B show examples of user interface displays.
Figure 4B:
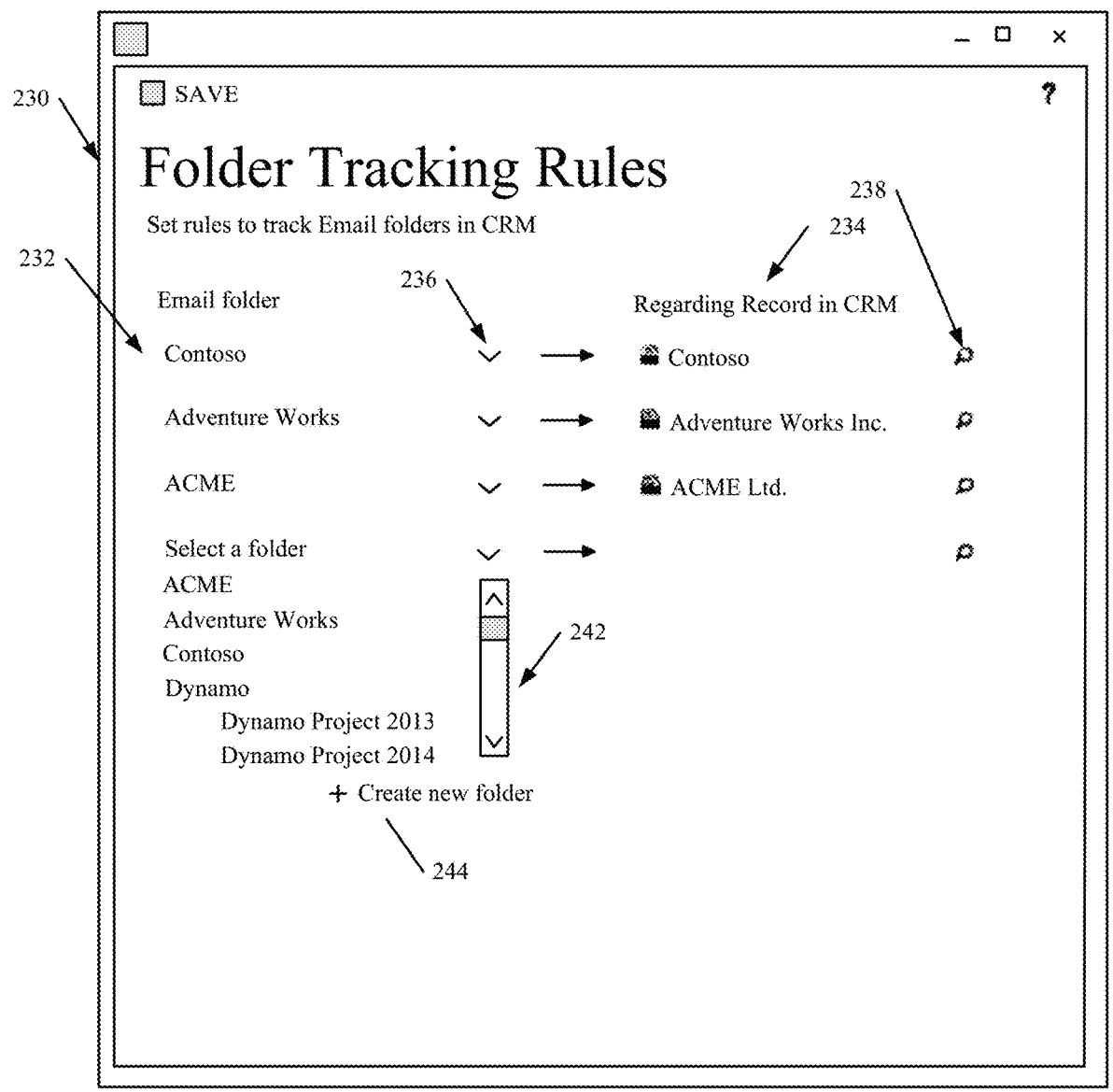

Folder-to-entity mapping component 176 then detects user inputs selecting folders to be tracked and associating the selected folders with entities or objects in system 104. This is indicated by blocks 226 and 228 in FIG. 3, respectively. FIGS. 4A and 4B show examples of user interface displays that can be generated by visualization generator 179, in order to do this.

FIG. 4A, for instance, shows one example of a user interface display 230. Display 230 displays the e-mail folders in the folder hierarchy for the present user generally at 232. Each folder is represented by an element in the folder hierarchy displayed at 232. It also displays a set of entities illustrated generally at 234, with which electronic mail messages in the folders shown generally at 232 are to be associated, inside of computing system 104. In the example shown in FIG. 4A, the user has set the folder tracking so that all electronic mail messages that arrive at the "Contoso" folder in the user's inbox in e-mail computing system 102 are to be mapped to the "Contoso" entity record within computing system 104. It also shows that any e-mails that arrive at the "Adventure Works" folder in e-mail system 102, for the present user, are to be mapped to the "Adventure Works, Inc." entity within system 104. Similarly, any e-mail messages that arrive in the "Acme" folder are to be mapped to the "Acme, Ltd." entity in computing system 104.

In the example shown in FIG. 4A, the illustrated mapping means that, for tracking within computing system 104, the emails are to have their "Regarding" field set to the corresponding entity. For instance, an e-mail that is mapped to the "Contoso" entity using user interface display 230 will automatically have its "Regarding" field set to refer to "Contoso", so that it can be tracked or otherwise managed based on the information in the "Regarding" field. Examples of this are described in greater detail below.

Display 230 also illustratively includes a selector mechanism (shown generally at 236) that allows the user to set the type of association between the e-mail and the entity in system 104. Similarly, it includes a browse user input mechanism shown generally at 238 that allows the user to browse or otherwise search for different entities or components of system 104 with which the designated e-mails are to be associated.

FIG. 4B is similar to FIG. 4A, and similar items are similarly numbered. However, FIG. 4B shows that the user has now actuated the "New Folder Mapping" mechanism 240 (shown in FIG. 4A). In that case, folder-to-entity mapping component 176 generates a scrollable list (shown generally at 242) listing all of the various folders in the folder hierarchy that have been retrieved for the present user. The user can add additional folders by actuating the "Create New Folder" mechanism 244 as well.

Returning again to the description of FIG. 3, once the user has provided the inputs that map electronic mail messages from various folders to entities or other components within computing system 104, folder-to-entity mapping component 176 then saves that information as mappings 177. This is indicated by block 246 in FIG. 3. The information can take a wide variety of different forms. In one example, the mapping information for a given folder includes a mailbox identifier 248 that identifies the overall mailbox for this user. It also includes a folder identifier 250 that identifies the specific folder that is being mapped, along with a regarding object identifier 252 that identifies the particular object or entity (or other component) of computing system 104 that the folder is associated with. In addition, it can include folder hierarchy location information 254 that identifies where, in the folder hierarchy for the present user, the identified folder resides. This can be used for displaying that folder, in context within its hierarchy, to the user. In can include a folder sync state 256 which indicates whether the folder has already been synced (at least once) by synchronization system 178. It can include a wide variety of other information 258, as well.

Once the mappings have been generated, e-mail tracking system 154 performs automatic folder tracking based upon the folder mapping information 177. This is indicated by block 260 in FIG. 3, and it is described in greater detail below with respect to FIG. 7.

Figure 5:
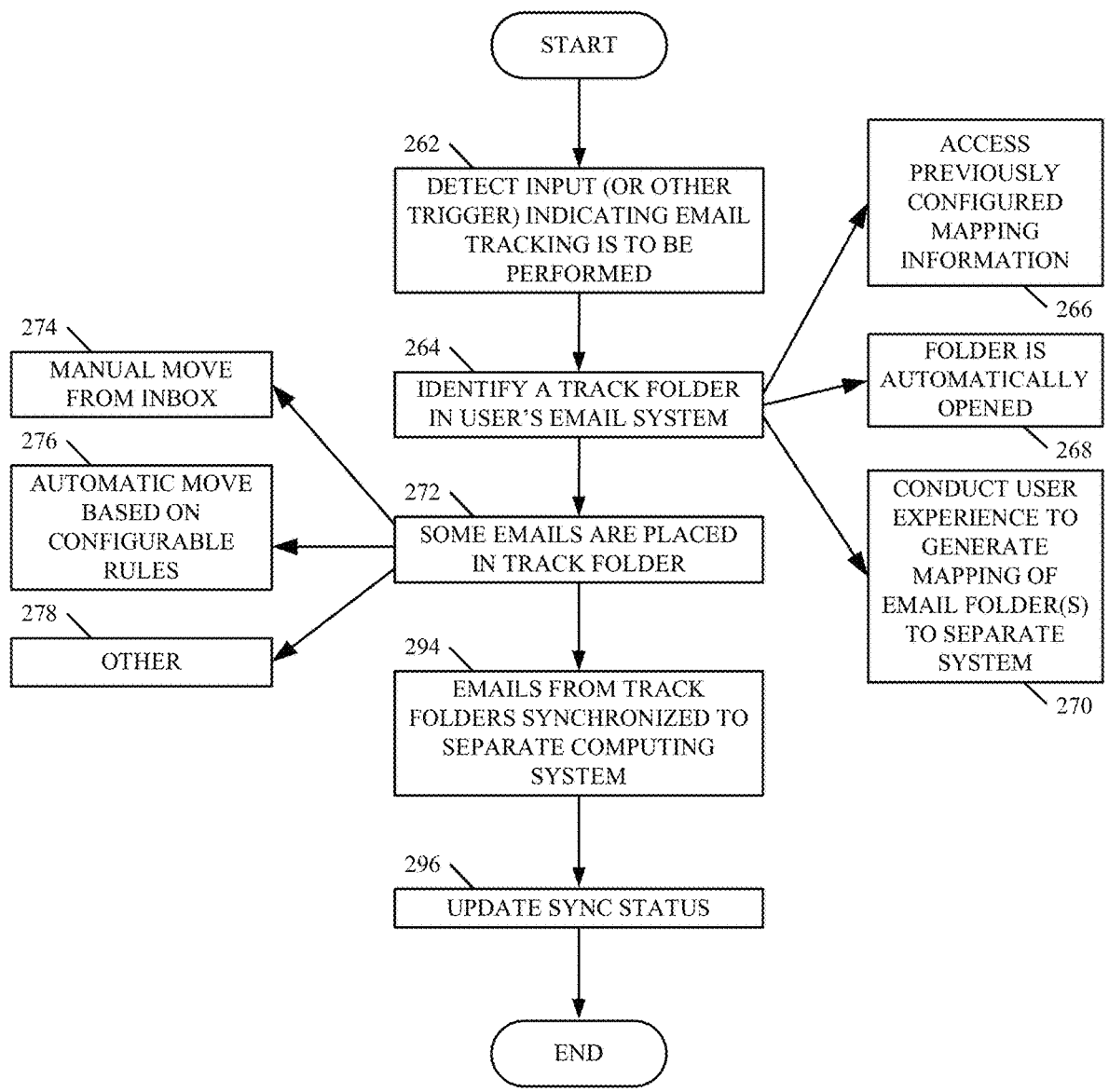
FIG. 5 is a flow diagram illustrating one example of the operation of the architecture illustrated in FIG. 1 in synchronizing electronic mail messages from selected mailboxes in the electronic mail system to the separate computing system.

FIG. 5 is a flow diagram illustrating one example of the operation of synchronization system 178 indicating, in general, what happens when a synchronization is triggered. In one example, synchronization system 178 first detects an input or other trigger indicating that e-mail tracking is to be performed. This is indicated by block 262 in FIG. 5.

Folder search component 186 then identifies a set of folders (or track folders) in the user's e-mail computing system 102 that are to be tracked within separate computing system 104. This is indicated by block 264. This can be done by accessing the previously configured mapping information 177 that was previously configured by the user. This is indicated by block 266. In another example, the user 146 can indicate at some point (such as through a corresponding user experience) to separate computing system 104 that the user wishes to track certain e-mails within computing system 104. In that case, synchronization system 178 automatically communicates with e-mail computing system 102 to open a new track folder, within the folder system hierarchy 120 of the e-mail computing system 102. Automatically creating or opening a folder to be tracked within e-mail computing system 104 is indicated by block 268. In still another example, entity-to-mapping component 176 can be invoked to conduct the user experience described above with respect to FIGS. 3-4B, to allow the user to perform the mapping, where no mapping yet exists. This is indicated by block 270. Identifying the folder to be tracked within computing system 104 can be done in a wide variety of other ways as well.

At some point, new incoming e-mails will end up in the folder or folders in e-mail computing system 102, that are to be tracked within separate computing system 104. This is indicated by block 272. The e-mails can end up in those folders in a variety of different ways. For instance, many e-mail computing systems 102 provide functionality that allows a user to manually move e-mails from a general inbox (for instance) into a folder. Manually moving an e-mail into a folder that is to be tracked within computing system 104 is indicated by block 274.

Some e-mail computing systems 102 also allow the user to setup or configure rules that automatically route some incoming e-mails into different folders, based upon different routing or filtering criteria. Automatically moving e-mails into one of the folders to be tracked based on configurable rules is indicated by block 276.

E-mails can end up in the folders in e-mail computing system 102, that are to be tracked within separate computing system 104, in other ways as well. This is indicated by block 278.

Figure 5A:
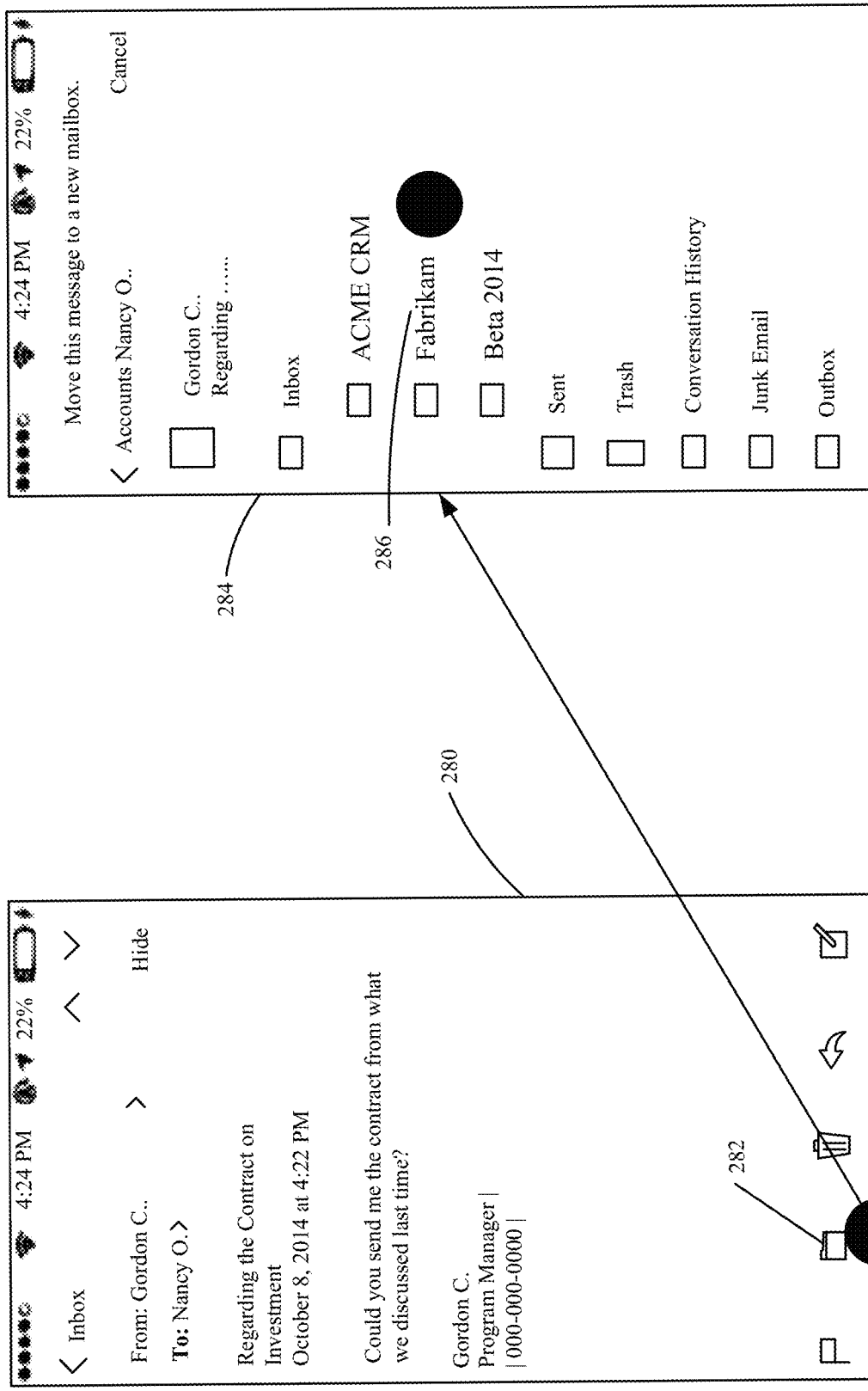
FIGS. 5A and 5B show examples of user interface displays.
Figure 5B:
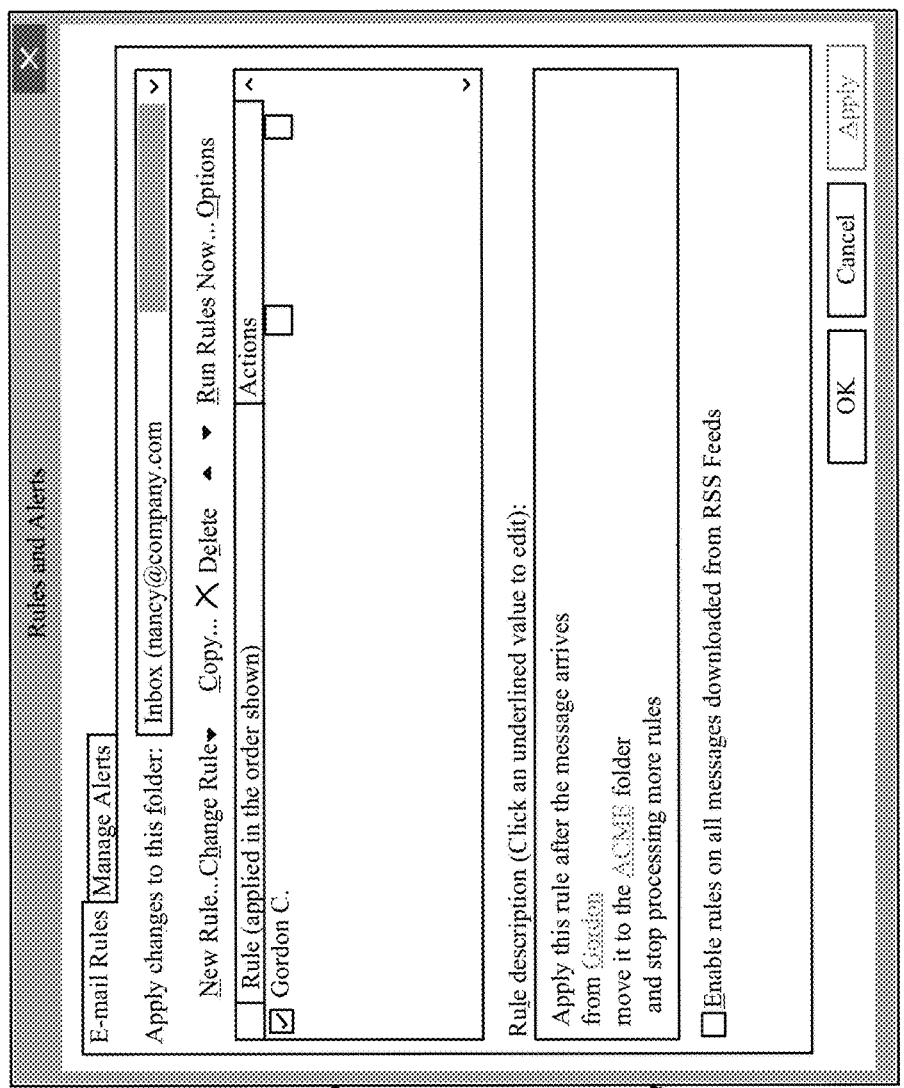
Figure 5B:
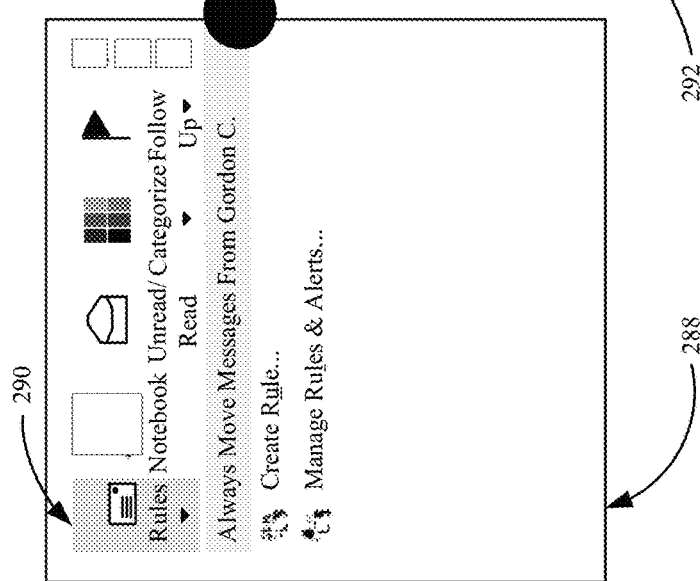

FIGS. 5A and 5B show two examples of moving emails into a folder to be tracked. FIG. 5A shows a phone display 280 that is displaying an e-mail message from a recipient to a user with a regarding field that reads "Regarding the contract on investment". By actuating a folder user input mechanism 282, second display 284 is displayed which displays the inbox folders for the user. The user can actuate a user input mechanism 286 corresponding to an inbox folder to automatically move the e-mail message displayed on display 280, into that inbox folder. This is illustratively native functionality for the e-mail computing system 102 that can be accessed through a phone or other mobile device, through a desktop computer, etc.

FIG. 5B shows a portion of a user interface display 288 that allows the user to setup a rule to automatically move messages from a given recipient into a particular folder. Display 288 allows the user to actuate user input mechanisms for creating rules, managing rules and alerts, etc. When the user wishes to manage a rule, the user can access a rules user input mechanism 290 and another display 292 is displayed that allows the user to manage the user's rules. In the example shown in FIG. 5B, the user is setting up a rule so that all e-mail messages received from a sender named "Gordon" are moved to the "Acme" folder in the user's inbox. It will be noted that FIGS. 5A and 5B show only two examples of how electronic mail messages may be routed to a given folder within the user's inbox.

Returning again to the description of FIG. 5, when synchronization is to be performed, and when the folders that are to be tracked have new e-mail content, then synchronization system 178 synchronizes those e-mails to the separate computing system 104. This is indicated by block 294 in FIG. 5. Sync status processing component 182 then updates the synchronization status of those messages in e-mail computing system 102. This is indicated by block 296. It can also do this by updating the status of those messages within separate computing system 104, indicating when they were synchronized.

Figure 6:
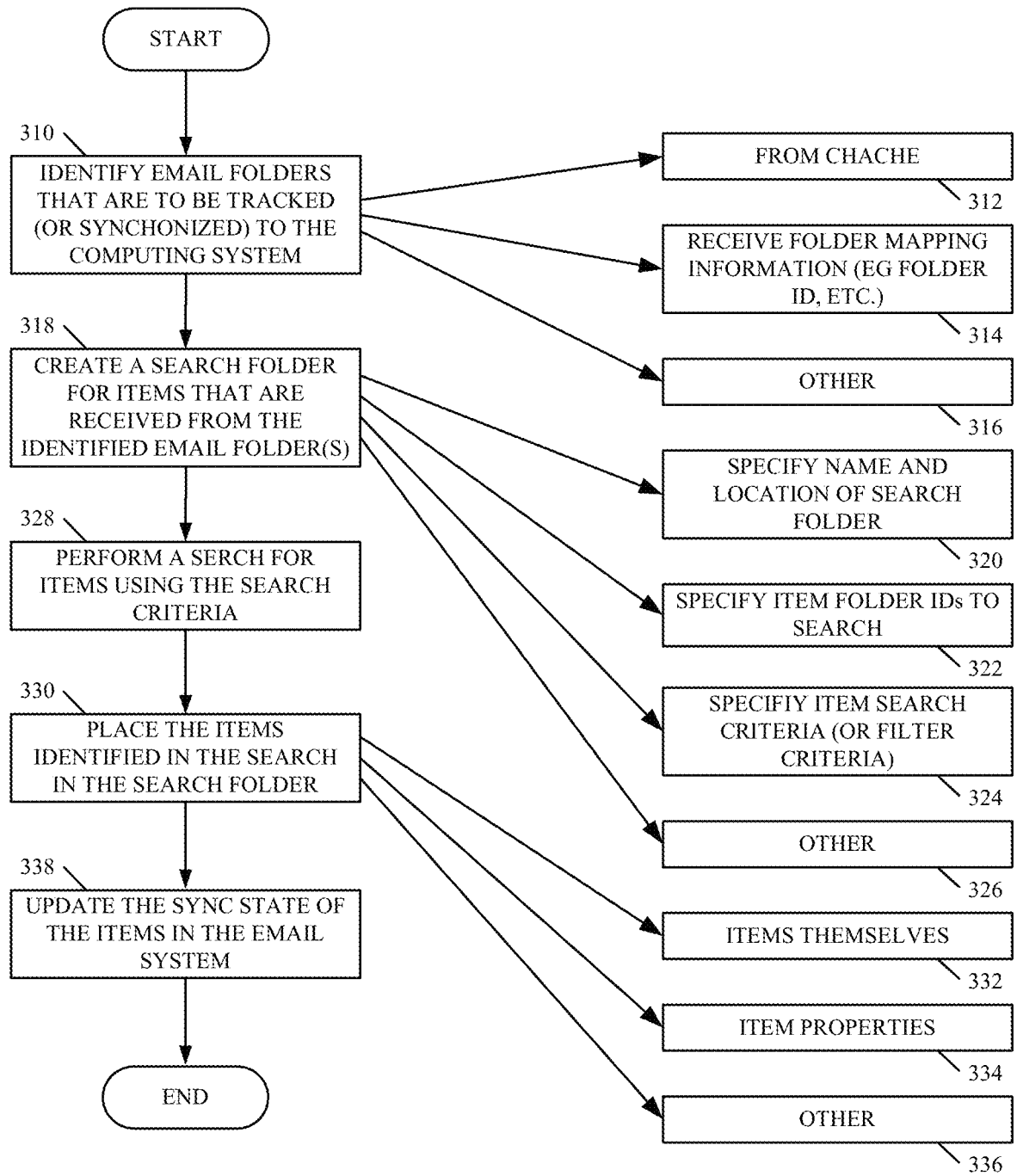
FIG. 6 is a flow diagram illustrating one example of the operation of the architecture shown in FIG. 1 in illustrating how electronic mail messages are moved from the electronic mail system to the separate computing system, in more detail.

FIG. 6 is a flow diagram showing one example of the operation of synchronization system 178, in obtaining e-mail items (e.g., email messages) from identified folders in e-mail system 102, in more detail. It is assumed for the sake of the description in FIG. 6 that synchronization system 178 has determined that it is time to synchronize information from the folders in e-mail computing system 102, to separate computing system 104. As mentioned above, this can be determined based on a wide variety of different criteria, it can be performed periodically or otherwise intermittently, etc.

Folder search component 186 first identifies the e-mail folders in e-mail computing system 102 that are to be tracked (or synchronized) to computing system 104. This is indicated by block 310 in FIG. 6. In one example, this information can be stored in mailbox folder cache 180. This is indicated by block 312. In another example, component 186 can read mapping information 177 to obtain the folder identifiers for such folders. This is indicated by block 314. Identifying the email folders that are to be tracked can be performed in other ways as well, and this is indicated by block 316.

Folder search component 186 then creates a search folder for items that are to be received from the identified e-mail folders. This is indicated by block 318. That is, the search folder is the folder that will receive all of the e-mail items that are synchronized from e-mail computing system 102 during this synchronization operation, and that are to be tracked within separate computing system 104. Creating the search folder can include specifying a name and location for the search folder within data store 156 in computing system 104. This is indicated by block 320. It can specify the identifiers for the electronic mail folders that are to be searched. This is indicated by block 322. It can identify search criteria (or filter criteria) for finding items within the identified folders that are to be synchronized to system 104. This is indicated by block 324. The search folder can be created in other ways as well, and this is indicated by block 326.

Table 1 shows one example of how a search folder is created.

TABLE 1

```
        // Set search folder name
        SearchFolderType folder = new SearchFolderType( );
        folder.DisplayName = FolderAutoTrackProvider.SEARCH_FOLDER_NAME;
        // Set search parameters
        folder.SearchParameters = new SearchParametersType( );
        folder.SearchParameters.Traversal =
SearchFolderTraversalType.Shallow;
        folder.SearchParameters.TraversalSpecified = true;
        // Set the base folder under which to search
        folder.SearchParameters.BaseFolderIds = new
                    DistinguishedFolderIdType[countOfFoldersToSync
                ];
        // Loop through each folder id to sync and add it to search
parameters
        for (int i = 0; i < countOfFoldersToSync; i++)
        {
            folder.SearchParameters.BaseFolderIds[i] = folders[i].Id;
        }
                // Create the search filter
        var restrictionType = new RestrictionType( );
        var extendedPropertyPath =
                    ((FolderBasedTrackingIncomingEmailProvider)this
                    .provider).
                    GetLinkStateTrackerExtendedFieldTypePath( );
        var fieldUriOrConstantType = new FieldURIOrConstantType( );
        var constantValueType = new ConstantValueType( );
        constantValueType.Value =
        FolderBasedTrackingIncomingEmailProvider.CRM_LINK_STATE_TRACKER
        _TRACKED;
        fieldUriOrConstantType.Item = constantValueType;
        var isEqualToType = new IsEqualToType( );
        isEqualToType.Item = extendedPropertyPath;
        isEqualToType.FieldURIOrConstant = fieldUriOrConstantType;
        var notType = new NotType( );
        notType.Item = (SearchExpressionType)isEqualToType;
        restrictionType.Item = notType;
        folder.SearchParameters.Restriction = restrictionType;
        // Specify where the new folder is created.
        DistinguishedFolderIdType distFolder =
GetSearchFoldersDistinguishedFolderIdType( );
        TargetFolderIdType targetID = new TargetFolderIdType( );
        targetID.Item = distFolder;
        // Create the request.
        request = new CreateFolderType( );
        request.Folders = new SearchFolderType[ ] { folder };
        request.ParentFolderId = targetID;
```

The search folder provides a single view for all items (electronic mail messages) that need to be processed or tracked within system 104. Table 1 shows that the search folder name is first specified, and then search parameters are set. Table 1 also shows that the base folder under which to search is identified. In one example, for instance, the base folder may be the user's inbox. Table 1 also shows that the folder identifiers for the folders to be tracked are added to the search parameters, a search filter is created and the location where the new folder is to be created within system 104 is specified. The search folder can be created in other ways as well. For instance, instead of doing a shallow folder traversal, a deep traversal can be done to track subdirectories as well. A wide variety of other changes can also be made.

E-mail identification component 188 then performs a search for e-mail items using the search criteria specified above with respect to block 324. It can do this in a variety of different ways. For instance, the email items satisfying the search criteria discussed above can be identified by their item identifiers. Those items can then be fetched or otherwise retrieved by communicating with e-mail computing system 102. They can also be retrieved along with any properties that may be desired for further processing.

E-mail retrieval component 190 retrieves them and places the e-mail items identified in the search, in the search folder. Performing a search and retrieving the items and placing them in the search folder are indicated by block 328 and 330, respectively. Retrieving the individual e-mail items (e.g., messages) themselves is indicated by block 332 and retrieving any other item properties is indicated by block 334. They can be retrieved in other ways as well, and this is indicated by block 336.

Sync status processing component 182 then updates the synchronization state of the e-mail items in the e-mail system 102. This is indicated by block 338. For instance, it can call e-mail computing system 102, through communication component 110, or otherwise, and ask it to update a synchronization property for the e-mail items that have been synchronized. It can call e-mail computing system 102 in other ways as well.

Figure 7:
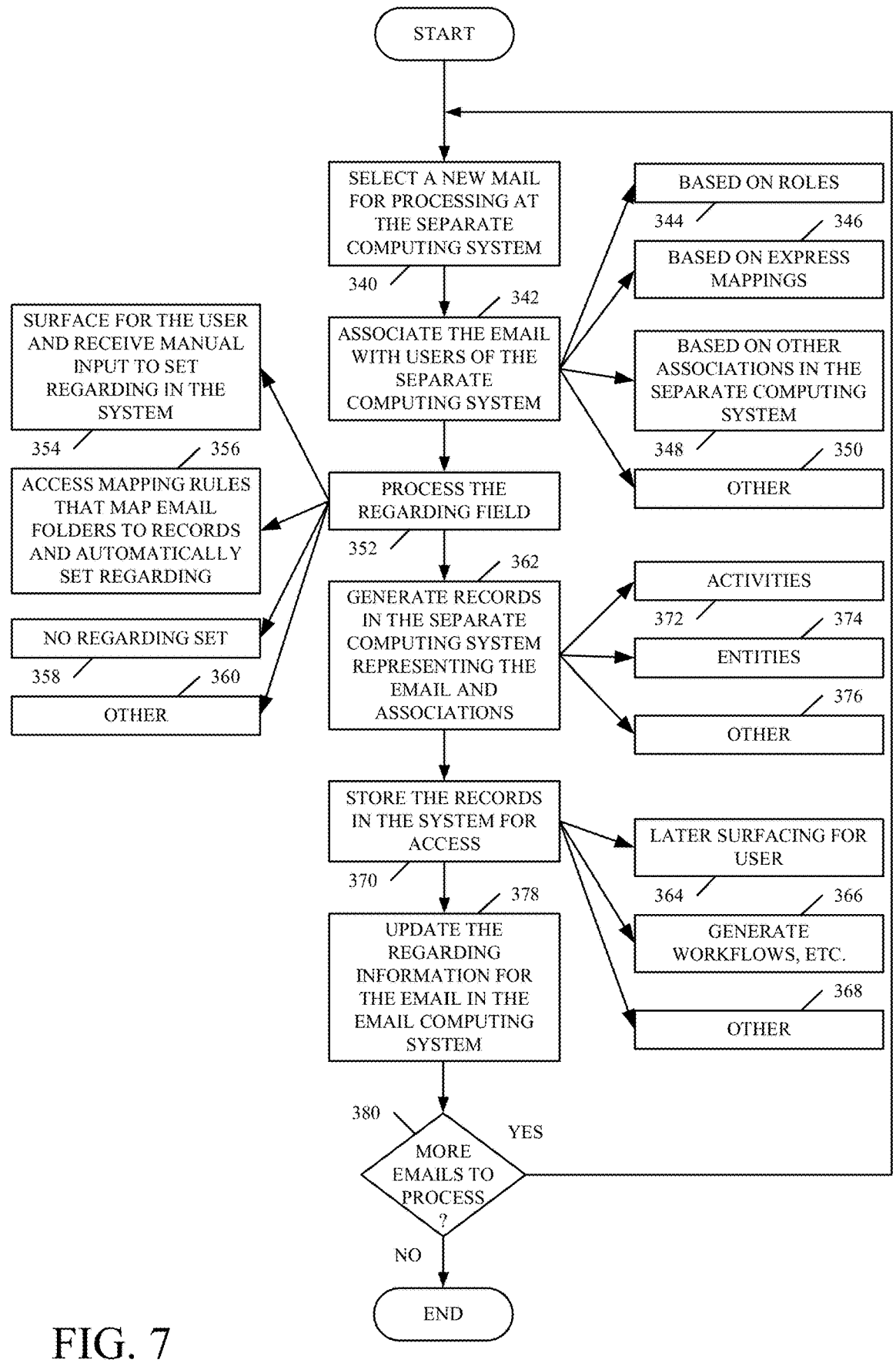
FIG. 7 is a flow diagram illustrating one example of how electronic mail messages that are received at the separate computing system are processed.

FIG. 7 is a flow diagram illustrating one example of the operation of email-to-entity processing component 192. It is assumed that the identified e-mails have been received at e-mail tracking system 154 in separate computing system 104. One of the e-mail messages is then selected for processing at the separate computing system 104, by e-mail-to-entity processing component 192. This is indicated by block 340 in FIG. 7.

E-mail-to-entity processing component 192 then associates the e-mail with users of the separate computing system 104. This is indicated by block 342. It can be associated with the users based on roles as indicated by block 344. It can associate them based on express mappings between different users, as indicated by block 346. It can associate them based on other associations in the separate computing system 104, as indicated by block 348. For instance, it may be that two different users are part of a group or team in system 104. In that case, data store 156 will store metadata indicative of the membership of the various groups. The incoming e-mail may be associated with not only the user, but with individuals in various groups or teams that the user is a member of. The e-mail can be associated with various users in other ways as well, and this is indicated by block 350.

To associate the email with a user, a record (or entity) is illustratively created that represents the email. Association metadata for the record (or entity) is generated that identifies the users that the email is associated with. The association can be generated in other ways as well.

Once the e-mail is associated with a set of users (e.g., one or more users), the email is associated with an entity (or other component) within system 104. In one example, the regarding field is processed by component 192. This is indicated by block 352 in FIG. 7. The regarding field can be used to associate the entity representing the email with other entities or components within computing system 104, by setting a textual value in the regarding field to somehow identify that entity. For instance, in one example, component 192 surfaces the e-mail for the user, in context, indicating that the regarding field has not been set. In that case, the user can provide a manual input to set the textual value of the regarding field of the e-mail, in computing system 104. Manual association between the e-mail and an entity, based upon manual adjustment of the regarding field, is indicated by block 354.

In another example, component 192 accesses mappings 177 that map the e-mail folders to records in separate computing system 104, and automatically adjusts the regarding field of the email, based upon that mapping information. This is indicated by block 356.

In another example, it may be that the user does not wish to have any regarding field set, but that the user wishes to have the e-mails surfaced, for the user, within separate computing system 104. Simply surfacing the e-mails without setting the regarding field (or otherwise associating the e-mail with a given entity) is indicated by block 358. The associations between the e-mails and entities can be performed in other ways as well, and this indicated by block 360.

Component 192 then generates any other records in the separate computing system 104 that are needed to represent the e-mail and its associations with various entities in computing system 104. This is indicated by block 362. For instance, it can generate an activity record in computing system 104 that reflects the receipt of an e-mail associated with a given entity, as an activity that is associated with that entity. Generating an activity record is indicated by block 364. It can generate other records or entities as well. For instance, it may be that the e-mail represents content which maps to a given entity (such as a quote, a vendor contact entity, or a wide variety other entities). In that case, component 192 can also create the corresponding entity (it can generate a quote entity, a vendor contact entity, etc.) based on the e-mail. This is indicated by block 366. Other records can be generated as well. This is indicated by block 368.

Any records that have been created that represent the e-mail and its associations are then stored in data store 156 for later access or further processing. This is indicated by block 370. For instance, they can be stored for being surfaced, when user 146 next accesses the portion of computing system 104 to which the e-mail has been associated. Surfacing the information for a user is indicated by block 372. They can be used to generate workflows, processes, tasks, etc., within computing system 104. For instance, it may be that the e-mail represents a customer accepting a quote that was previously made to the customer. In that case, the acceptance may trigger a workflow that generates an invoice. Of course, this is only one example. Generating a workflow, process, task, etc., within separate computing system 104, based upon the e-mail, is indicated by block 374. The records can be processed and stored for other reasons or in other ways as well, and this is indicated by block 376.

Component 192 then updates the regarding information for the e-mail in the e-mail computing system 102. This is indicated by block 378. It can be done in the same way as updating the synchronization state for that e-mail, or in different ways.

E-mail-to-entity processing component 192 then determines whether there are any more e-mails in the search folder that need to be processed (e.g., associated with users or entities in separate computing system 104). If so, processing reverts to block 340. If not, the newly received e-mails have all been processed. This is indicated by block 380 in FIG. 7.

Figure 7A:
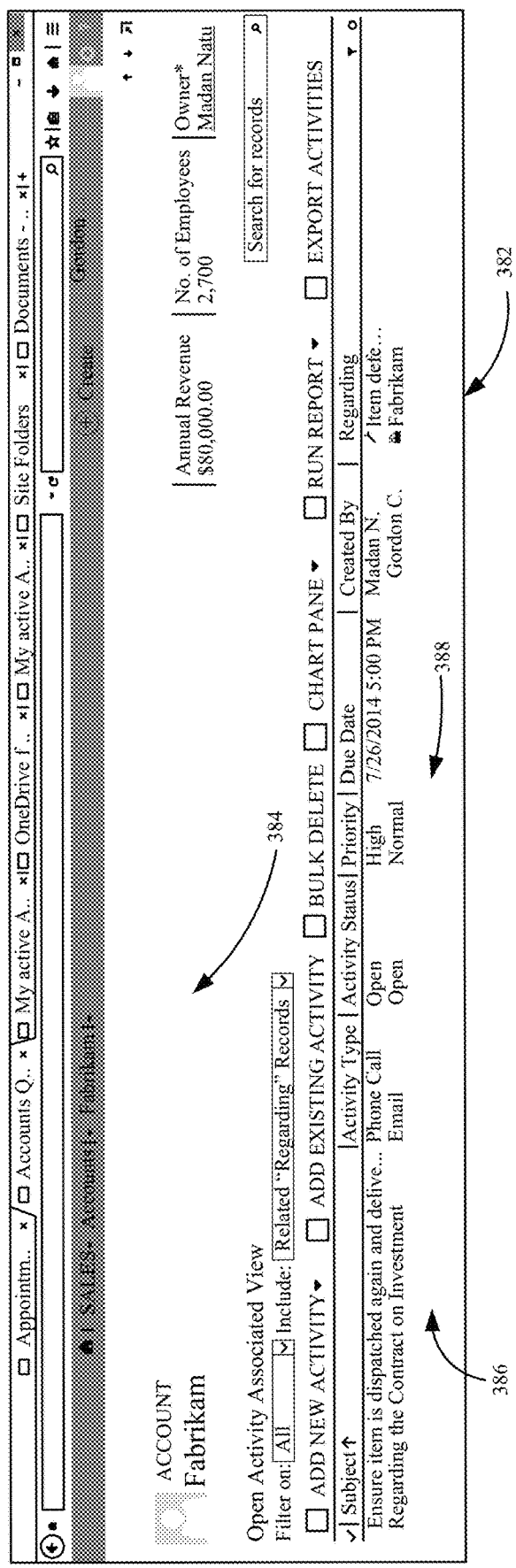
FIG. 7A shows one example of a user interface display.

FIG. 7A shows one example of a user interface display in which an e-mail has been associated with an entity within computing system 104, by changing its "Regarding" field, to associate it with an "Account" entity, as an activity, within system 104. The e-mail shown above in FIG. 5A has been processed so that it is now associated with the "Fabrikam" account entity within system 104. Thus, when user 146 next logs on to system 104 and accesses the "Fabrikam" account entity, the user can actuate a user input mechanism (such as tab 384) to see any recent activities with respect to the "Fabrikam" account. User interface display 382 shows that the e-mail that was previously processed and associated with the "Fabrikam" account entity now shows up as an open activity generally indicated at 386. The highlighted box 388 illustrates that the "Regarding" field of the e-mail has been changed to "Fabrikam", thus associating it, as an activity, with the "Fabrikam" account entity. It will be appreciated that this is only one example of how an e-mail can be retrieved from e-mail system 102, processed by system 104 so that it is associated with one or more entities within system 104, and then surfaced, in context, when the user accesses the associated entity. This can be done in a wide variety of other ways as well.

It will be noted that the above discussion has described a variety of different systems and components. It will be appreciated that such systems and components can be comprised of hardware items (such as processors and associated memory, or other processing components, some of which are described below) that perform the functions associated with those components. In addition, the systems and components can be comprised of software that is loaded into a memory and is subsequently executed by a processor or server, or other computing component, as described below. The systems and components can also be comprised of different combinations of hardware, software, firmware, etc., some examples of which are described below. These are only some examples of the different structures that can be used to form the systems and components described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
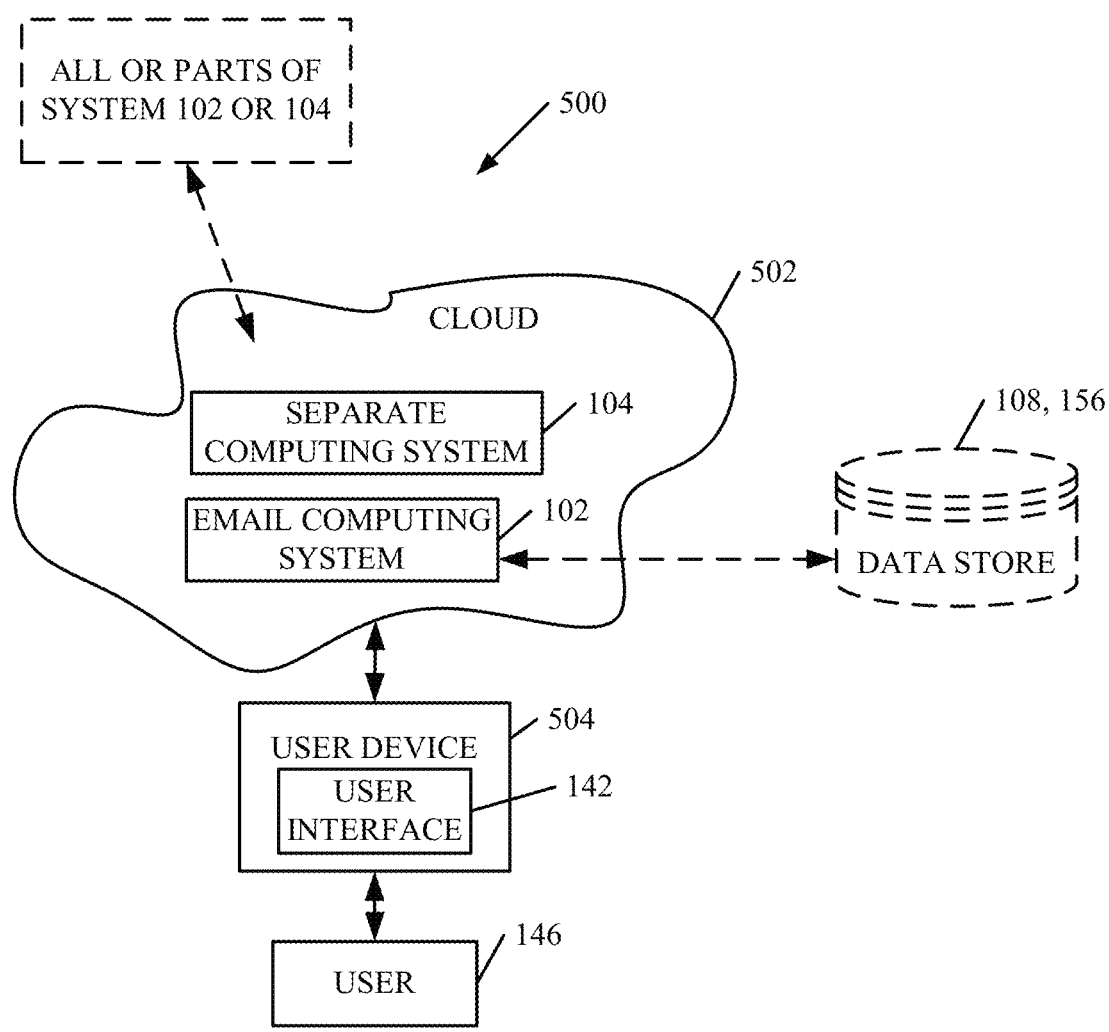
FIG. 8 is a block diagram showing one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that both systems 102 and 104 can be located in cloud 502 (which can be public, private, or a combination where portions are public while others are private). Therefore, user 146 uses a user device 504 to access those systems through cloud 502.

FIG. 8 also depicts another example of a cloud architecture. FIG. 8 shows that it is also contemplated that some elements of architecture 100 can be disposed in cloud 502 while others are not. By way of example, data stores 108 and/or 156 can be disposed outside of cloud 502, and accessed through cloud 502. In another example, either system 102 or system 104, or parts of either or both can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
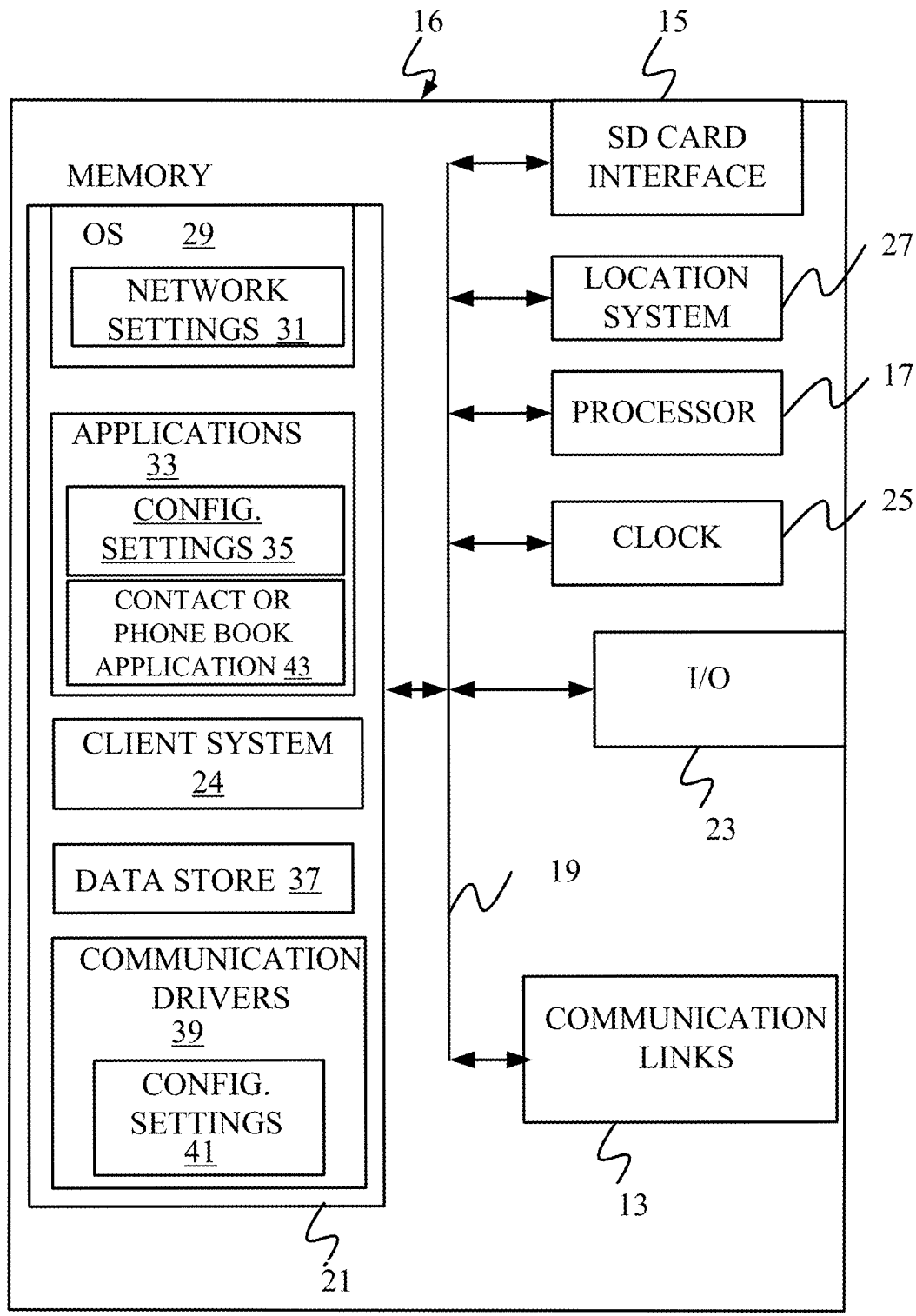
FIGS. 9-11 show examples of mobile devices that can be used in the architectures of the previous figures.
Figure 10:
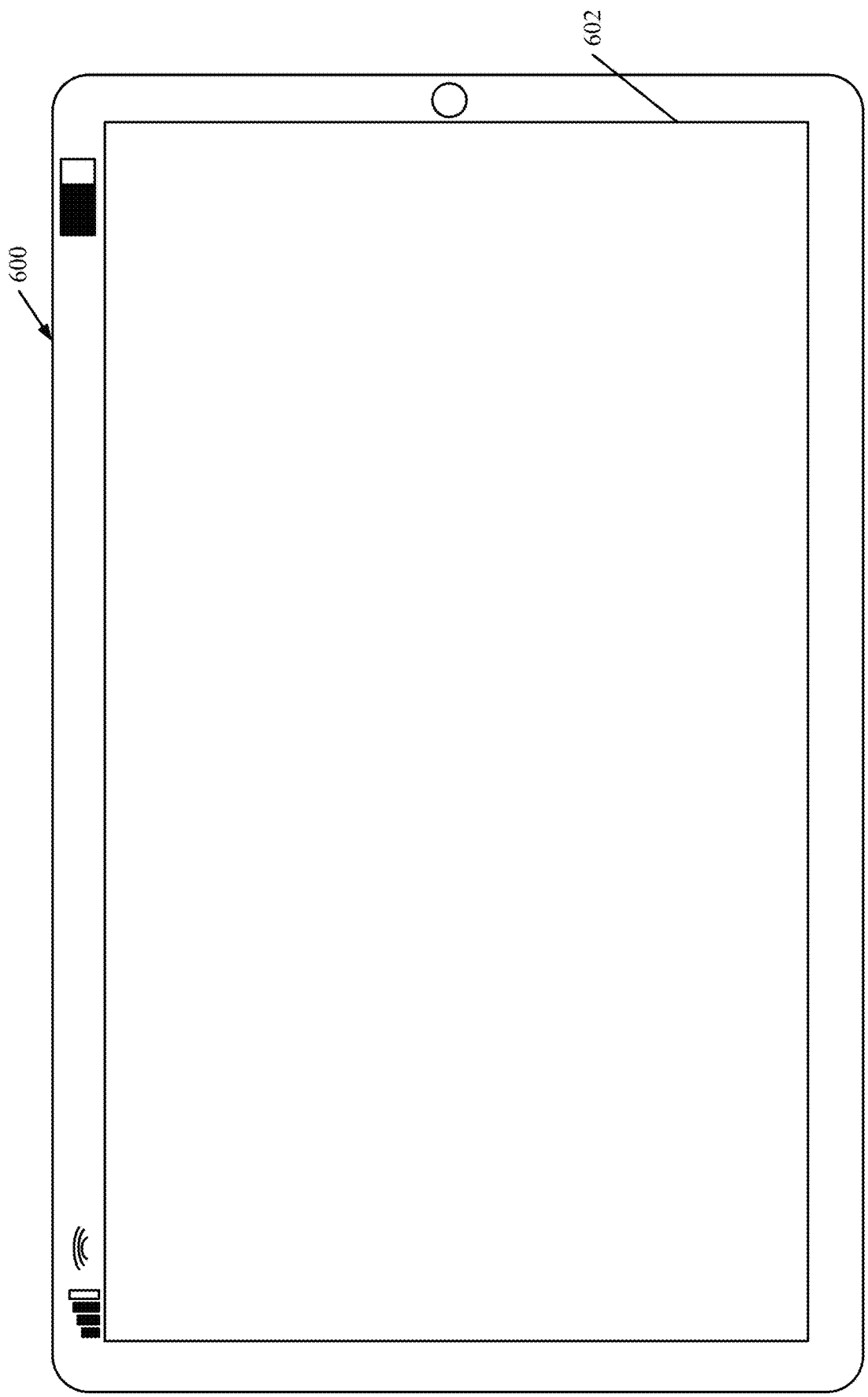
Figure 11:
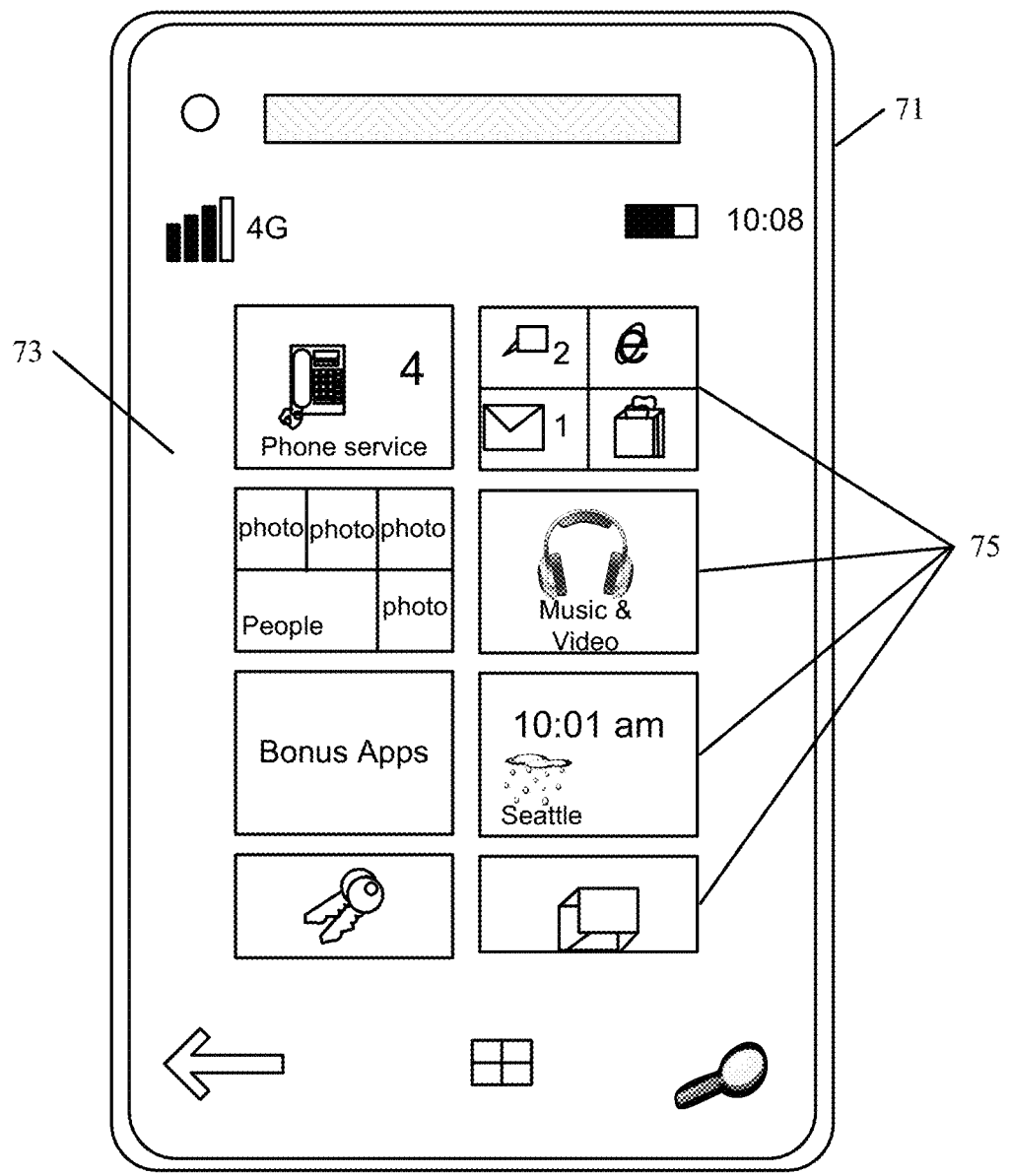

FIG. 9 is a simplified block diagram of one illustrative example of a handheld or mobile computing device that can be used as a user's or client's hand held device 16, in which the present architecture 100 (or parts of it) can be deployed or that interacts with architecture 100. FIGS. 10-11 are examples of handheld or mobile devices.

In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 112 or 150, or both from FIG. 1 or processor(s) in user device 504 in FIG. 8) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications or the items in data stores 108 or 156, for example, can reside in memory 21. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
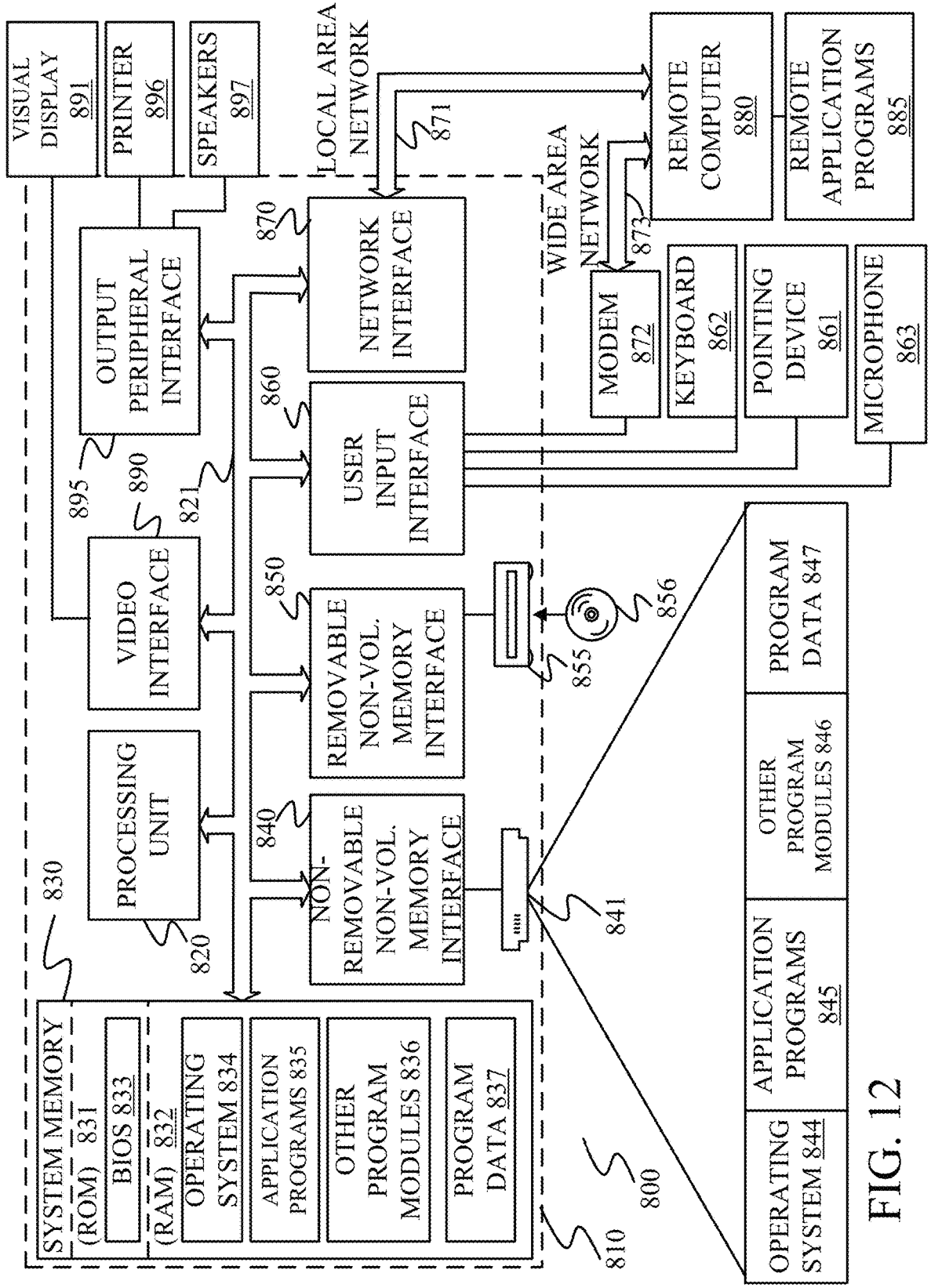
FIG. 12 is a block diagram illustrating one example of a computing environment that can be deployed in the architectures of the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processor 112 or 150 or others), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are examples and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a folder search component that identifies an electronic mail (email) folder in an email system that is to be tracked in the computing system;
an email message identification component that identifies an email message to be tracked in the computer system, in the identified email folder, based on an identification criterion; and
an email-to-entity processing component that generates an email record, indicative of the identified email, in the computing system and generates association data associating the email record with an entity in the computing system based on an association criterion.

Example 2 is the computing system of any or all previous examples and further comprising:

a user interface component that generates a visualization indicative of a display that surfaces the email record in a context of visualizing the entity in the computer system, based on the association data.

Example 3 is the computing system of any or all previous examples and further comprising:

a folder hierarchy retrieval component that retrieves, from the email system, a folder hierarchy indicative of a hierarchy of email folders for a user.

Example 4 is the computing system of any or all previous examples and further comprising:

a folder-to-entity mapping component that accesses the folder hierarchy and generates user interface mapping information indicative of a folder mapping user interface with a mapping user input mechanism that is actuated to generate a folder mapping that maps the email folder in the folder hierarchy to the entity in the computer system.

Example 5 is the computing system of any or all previous examples wherein the email-to-entity processing component uses the folder mapping as the association criterion.

Example 6 is the computing system of any or all previous examples wherein the email-to-entity processing component generates the email record with a regarding field and wherein the email-to-entity processing component associates the email record with the entity by setting a value of the regarding field of the email record.

Example 7 is the computing system of any or all previous examples wherein the email-to-entity processing component generates the email record with a regarding field and wherein the email-to-entity processing component associates the email record with the entity by generating user interface association information indicative of an association user interface display with a value setting user input mechanism that is actuated to set a value of the regarding field of the email record.

Example 8 is the computing system of any or all previous examples and further comprising:

a mailbox folder cache that caches the folder hierarchy and the folder mapping.

Example 9 is the computing system of any or all previous examples wherein the email-to-entity processing component associates the email record with a plurality of different users of the computing system based on user roles in the computing system.

Example 10 is the computing system of any or all previous examples wherein the email-to-entity processing component associates the email record with a plurality of different users of the computing system based on groups in the computing system to which the plurality of different users belong.

Example 11 is a computer implemented method, comprising:

identifying an electronic mail (email) folder in an email system that is to be tracked in a computing system that is separate from the email system;

identifying an email message to be tracked in the computer system, in the identified email folder, based on an identification criterion;

generating an email record, indicative of the identified email, in the computing system;

generating association data associating the email record with an entity in the computing system based on an association criterion; and generating a visualization indicative of a display that surfaces an indication of the email record during visualization of the entity in the computer system, based on the association data.

Example 12 is the computer implemented method of any or all previous examples and further comprising:

retrieving, from the email system, a folder hierarchy indicative of a hierarchy of email folders for a user.

Example 13 is the computer implemented method of any or all previous examples and further comprising:

accessing the folder hierarchy; and generating user interface mapping information indicative of a folder mapping user interface with a mapping user input mechanism that is actuated to generate a folder mapping that maps the email folder in the folder hierarchy to the entity in the computing system.

Example 14 is the computer implemented method of any or all previous examples wherein generating the email record comprises:

generating the email record with a regarding field; and associating the email record with the entity by setting a value of the regarding field of the email record.

Example 15 is the computer implemented method of any or all previous examples wherein generating the email record comprises:

generating the email record with a regarding field; and associating the email record with the entity by generating user interface association information indicative of an association user interface display with a value setting user input mechanism that is actuated to set a value of the regarding field of the email record.

Example 16 is the computer implemented method of any or all previous examples and further comprising:

accessing a set of user roles in the computing system; and associating the email record with a plurality of different users of the computing system based on the user roles in the computing system.

Example 17 is the computer implemented method of any or all previous examples and further comprising:

accessing group membership data in the computing system, the group membership data being indicative of groups in the computing system to which different users belong; and associating the email record with a plurality of different users of the computing system based on the group membership data.

Example 18 is a computing system, comprising:

a folder hierarchy retrieval component that retrieves, from an electronic mail (email) system, a folder hierarchy indicative of a hierarchy of email folders for a user;

a folder-to-entity mapping component that accesses the folder hierarchy and generates user interface mapping information indicative of a folder mapping user interface with a mapping user input mechanism that is actuated to generate a folder mapping that maps an email folder in the folder hierarchy to an entity in the computing system; and an email-to-entity processing component that generates an email record, indicative of an email message in the email folder, in the computing system and generates association data associating the email record with the entity in the computing system based on the folder mapping.

Example 19 is the computing system of any or all previous examples and further comprising:

a folder search component that identifies the email folder based on the folder mapping; and an email message identification component that identifies the email message in the identified email folder, based on an identification criterion.

Example 20 is the computing system of any or all previous examples wherein the email-to-entity processing component generates the email record with a regarding field and wherein the email-to-entity processing component associates the email record with the entity by setting a value of the regarding field of the email record.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to provide:
  an application component configured to execute an application workflow on a data object stored in the computing system, the data object comprising functionality associated with the application workflow;
  a connection component configured to communicate with an email system that is separate from the computing system;
  a synchronization system configured to access the email system using the connection component, the synchronization system comprising:
    a folder search component configured to identify an electronic mail (email) folder in the email system;
    an email message identification component configured to:
      based on an identification criterion, identify an email message, stored in the email system in the identified email folder, to be tracked by the synchronization system;
    an email-to-data object processing component configured to:
      store an email record in the computing system, the email record including content from the identified email; and
      based on an association criterion, generate association data associating the email record with the data object in the computing system; and
  a user interface component configured to:
    generate a representation of a user interface display that:
      includes a display element that represents the data object; and
      associates the email record with the data object based on the association data.

2. The computing system of claim 1, wherein the instructions provide:
a folder hierarchy retrieval component configured to retrieve, from the email system, a folder hierarchy indicative of a hierarchy of email folders for a user.

3. The computing system of claim 2 and wherein the instructions provide:
a folder-to-entity mapping component configured to:
  access the folder hierarchy;
  generate user interface mapping information indicative of a folder mapping user interface with a mapping user input mechanism; and
  based on an indication of actuation of the mapping user input mechanism, generate a folder mapping that maps the email folder in the folder hierarchy to the data object in the computing system.

4. The computing system of claim 3 wherein the email-to-data object processing component is configured to use the folder mapping as the association criterion.

5. The computing system of claim 4 wherein the email-to-data object processing component is configured to generate the email record with a regarding field, and wherein the email-to-data object processing component is configured to associate the email record with the data object by setting a value of the regarding field of the email record.

6. The computing system of claim 4 wherein the email-to-data object processing component is configured to generate the email record with a regarding field, and wherein the email-to-data object processing component is configured to associate the email record with the data object by generating user interface association information indicative of an association user interface display with a value setting user input mechanism that is actuated to set a value of the regarding field of the email record.

7. The computing system of claim 3 wherein the instructions provide:
a mailbox folder cache is configured to cache the folder hierarchy and the folder mapping.

8. The computing system of claim 4 wherein the email-to-data object processing component is configured to associate the email record with a plurality of different users of the computing system based on user roles in the computing system.

9. The computing system of claim 4 wherein the email-to-data object processing component is configured to associate the email record with a plurality of different users of the computing system based on groups in the computing system to which the plurality of different users belong.

10. A method performed by a computing system, the method comprising:
identifying an electronic mail (email) folder, in an email system that is separate from the computing system;
based on an identification criterion, identifying an email message, in the identified email folder, to be tracked by a synchronization component associated with the computing system that is separate from the email system;
receiving, from the email system, content from the identified email message;
generating an email record in the computing system, the email record including of the content from the identified email message and including a regarding field;
based on an association criterion, associating the email record with a data object in the computing system by setting a value of the regarding field of the email record,
  wherein an application component associated with the computing system is configured to execute an application workflow on the data object, the data object comprising functionality associated with the application workflow; and
generating a representation of a user interface display that:
  includes a display element that represents the data object; and
  associates the email record with the data object based on the association data.

11. The computer implemented method of claim 10 and further comprising:
retrieving, from the email system, a folder hierarchy indicative of a hierarchy of email folders for a user.

12. The computer implemented method of claim 11 and further comprising:
accessing the folder hierarchy; and
generating user interface mapping information indicative of a folder mapping user interface with a mapping user input mechanism that is actuated to generate a folder mapping that maps the email folder in the folder hierarchy to the data object in the computing system.

13. The computer implemented method of claim 12 wherein generating the email record comprises:
   generating the email record with a regarding field; and
   associating the email record with the data object by generating user interface association information indicative of an association user interface display with a value setting user input mechanism that is actuated to set a value of the regarding field of the email record.

14. The computer implemented method of claim 12 and further comprising:
   accessing a set of user roles in the computing system; and
   associating the email record with a plurality of different users of the computing system based on the user roles in the computing system.

15. The computer implemented method of claim 12 and further comprising:
   accessing group membership data in the computing system, the group membership data being indicative of groups in the computing system to which different users belong; and
   associating the email record with a plurality of different users of the computing system based on the group membership data.

16. A computing system, comprising:
   a processor; and
   memory storing instructions executable by the processor, wherein the instructions, when executed, configure the computing system to:
      execute an application workflow on a data object defined in the computing system, the data object comprising functionality associated with the application workflow;
      retrieve, from an electronic mail (email) system that is separate from the computing system, a folder hierarchy indicative of a hierarchy of email folders for a user;
      generate user interface mapping information indicative of a folder mapping user interface with a mapping user input mechanism;
      based on an indication of actuation of the mapping user input mechanism, generate a folder mapping that maps an email folder in the folder hierarchy to the data object in the computing system; and
      generate an email record in the computing system, the email record including information corresponding to an email message in the email folder; and
      generate association data associating the email record with the data object in the computing system based on the folder mapping.

17. The computing system of claim 16 wherein the instructions configure the computing system to:
   identify the email folder based on the folder mapping; and
   identify the email message in the identified email folder, based on an identification criterion.

18. The computing system of claim 17 wherein the instructions configure the computing system to generate the email record with a regarding field, and associate the email record with the data object by setting a value of the regarding field of the email record.

19. The computing system of claim 16, wherein the instructions, when executed, configure the computing system to:
   search the email system to identify a plurality of email messages in the email folder that is mapped to the data object in the computing system;
   retrieve each email message, in the plurality of email messages, from the email system and generating an email record in the computing system that synchronizes content of the retrieved email message; and
   generate a synchronization status record in the computing system that indicates whether the content of each email message, in the plurality of email messages, has been synchronized to the computing system.

* * * * *